(12) United States Patent
Feller

(10) Patent No.: US 6,729,192 B1
(45) Date of Patent: May 4, 2004

(54) MOVING TARGET FLOW SENSOR

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 10/211,211

(22) Filed: Aug. 2, 2002

(51) Int. Cl.[7] .............................................. G01F 15/00
(52) U.S. Cl. ................................................. 73/861.77
(58) Field of Search ..................... 73/861.72, 861.74, 73/861.77, 86.75

(56) References Cited

U.S. PATENT DOCUMENTS

| | | | | |
|---|---|---|---|---|
| 4,308,755 A | * | 1/1982 | Millar et al. ............ | 73/861.77 |
| 4,397,195 A | * | 8/1983 | Hayward ................. | 73/861.74 |
| 4,432,212 A | * | 2/1984 | Tachibana et al. ........... | 62/229 |
| 4,509,696 A | * | 4/1985 | Donaldson ................... | 241/15 |
| 5,323,645 A | * | 6/1994 | Endres et al. .............. | 73/118.1 |
| 6,612,166 B2 | * | 9/2003 | Golly et al. ............. | 73/170.02 |

* cited by examiner

Primary Examiner—Edward Lefkowitz
Assistant Examiner—Jewel V. Thompson
(74) Attorney, Agent, or Firm—David Kiewit

(57) ABSTRACT

A moving target flow sensor has at least one vane mounted on a shaft and rotated or oscillated in a flowing fluid. Changes in the drag forces are measured to determine the flow rate of the fluid, and, in some cases, to determine the direction of fluid flow. In some arrangements a compliant coupling is connected in a shaft between a drive transducer and a moving vane so that the instantaneous shaft speed can vary. In another arrangement, several vanes are driven by transducers that are controlled to provide a selected average rate of rotation or oscillation. In all cases, because only a change in either angular setting or angular speed of the shaft is detected, the flow sensor is able to operate over a relatively wide operating range and its long term drift is relatively low.

15 Claims, 4 Drawing Sheets

MOVING TARGET FLOW SENSOR

FIELD OF THE INVENTION

This invention relates to apparatus for determining the rate of flow of a fluid by sensing forces exerted by the fluid on a moveable element in the flow stream.

Moving target meters are commercially available to measure the flow rate of fluids and are commonly used in industrial applications. They are generally simple devices consisting basically of a target, such as a disc, suspended in the flow stream by a rod attached to a force transducer. The force or torque arising from flowing fluid impacting the disc is sensed by the transducer which provides an electrical output signal responsive to the flow rate of the fluid. The transducer is typically a static strain gauge, which is prone to drifts and to the effects of gravity, shock and vibration. Such sensors operate over a narrow range of flow rates and are less accurate, particularly at the low end of their ranges, than most other types of flow sensors.

An improved target flow meter has been disclosed by the inventor in his currently pending US Patent Application entitled Moving Target Flow Meter, said application filed on Apr. 1, 2002 and having Ser. No. 10/113,411. The disclosure of said application Ser. No. 10/113,411 is incorporated herein by reference.

It is an object of this invention to improve both the rangeability and accuracy of target meters.

BRIEF SUMMARY OF THE INVENTION

Preferred embodiments of the present invention use a target in a flowing fluid in which changes in orientation of the target with respect to the direction of flow of the fluid produce corresponding changes in flow impedance and therefore change the drag forces exerted by the fluid on the target These force changes are measured to determine the flow rate of the fluid, and, in some cases, to determine the direction of fluid flow.

One aspect of the invention is the provision of a method of measuring a rate of flow of a fluid with a moving target flow meter. This method comprises the stemps of; a) providing at least one vane extending radially outward from a respective shaft that is set perpendicular to a direction of flow of the fluid and that is wetted by the flowing fluid; b) repetitively turning, by means of an electromechanical drive transducer, the at least one vane about the respective shaft through an angular range selected so that the flowing fluid aids the turning operation within substantially a first half of the range and so as to inhibit the turning motion withing substantially the second half of the range; c)acquiring an elestrical signal representative of an alternating component of either the instantaneous rate of angular motion or the instantaneous angular position of the shaft, both of which are directly affected by the fluid drag; and d)generating an output representative of the rate of fluid flow from that alternating signal component.

In some preferred embodiments of the invention electromechanical drive transducers, which may be DC motors, rotate or oscillate several vanes in a flowing fluid. The angular speeds, which may vary with angle, are controlled to be identical on the average and the vanes are oriented with respect to each other so that the force of the flowing fluid, at any given instant, will tend to reduce the speed of rotation of one transducer while increasing the speed of the other. The transducers are responsive to their load environments and provide respective output signals to a signal processor which extracts conponents of the two transducer signals to provide an output signal representative of fluid flow rate. Only the alternating portions of the transducer signals are used by the signal processor. These are differentially extracted from the two transducers so that their flow related signals are summed while their common mode signals are rejected. Hence, this sensor is operable over a much wider flow range and has a relatively low long term drift rate when compared to conventional target flow meters.

In some embodiments of the invention an output shaft from a motor, or other suitable transducer, is connected to a flow target or vane by a compliant coupling, which may comprise, a torsion spring. In these embodiments the compliant coupling allows the vane to temporarily slow its rotational rate when the drag forces of the fluid are in opposition to its rotation and to speed up when its orientation changes so that the drag forces aid the rotation. The effects of fluid drag on the vane or vanes can be determined by means of a shaft motion sensing transducer, which may be either a shaft rotational speed transducer or a shaft angular position transducer. In some such embodiments a variation in turning speed is sensed, e.g., by means of a known photoelectric shaft speed sensor, to provide an output signal representative of fluid flow rate. In other embodiments employing a compliant coupling the motion of at least one shaft is sensed on both sides of the compliant coupling by shaft position sensors and the difference in angular position of the two portions of the shaft or shafts is used to determine the rate of fluid flow. In all such embodiments, because only a change in either angular setting or angular speed is detected, the flow sensor is able to operate over a relatively wide operating range and its long term drift is comparatively low.

Some variants of embodiments using a compliant coupling further comprise a known shaft encoder to also determine the angular position of the vane as it rotates at varying rates. In these sensors the signal processor combines the speed change and angular position data to determine both the flow rate and the flow direction. Sensors of this sort are used in making measurements in natural bodies of water, where it is desired to record flow speed and direction over a period of time.

Additional embodiments use one or more transducers to rotate or oscillate two vanes that are coupled to the drive source(s) by respective compliant couplings. The vanes are oriented with respect to each other and to the direction of the fluid flow so that when flow related drag forces on one vane oppose its rotation, the corresponding drag forces on the other vane aid its rotation. During a rotational cycle, the vanes alternately angularly lag or lead each other according to the drag forces they experience. The change in angular orientation between the discs is electronically detected to provide an output signal representative of fluid flow rate. Because only the angular change is detected, the sensor is able to operate over a relatively wide operating range and its long term drift is relatively low. In some embodiments of this sort the two vanes are matched so that the forces are equal. These vanes are preferably coupled to each other and to a single motor by a gear arrangement that transfers torques between the vane shafts. In this arrangement the motor essentially only provides the energy to overcome frictional losses.

Although it is believed that the foregoing recital of features and advantages may be of use to one who is skilled in the art and wishes to learn how to practice the invention, it will be recognized that the foregoing is not intended to list all of the features and advantages. Moreover, it may be noted that various embodiments of the invention may provide various combinations of the hereinbefore cited features and advantages of the invention, and that less than all of the recited features and advantages of the invention may be provided by some embodiments.

DETAILED DESCRIPTION OF THE INVENTION

Figure 1:
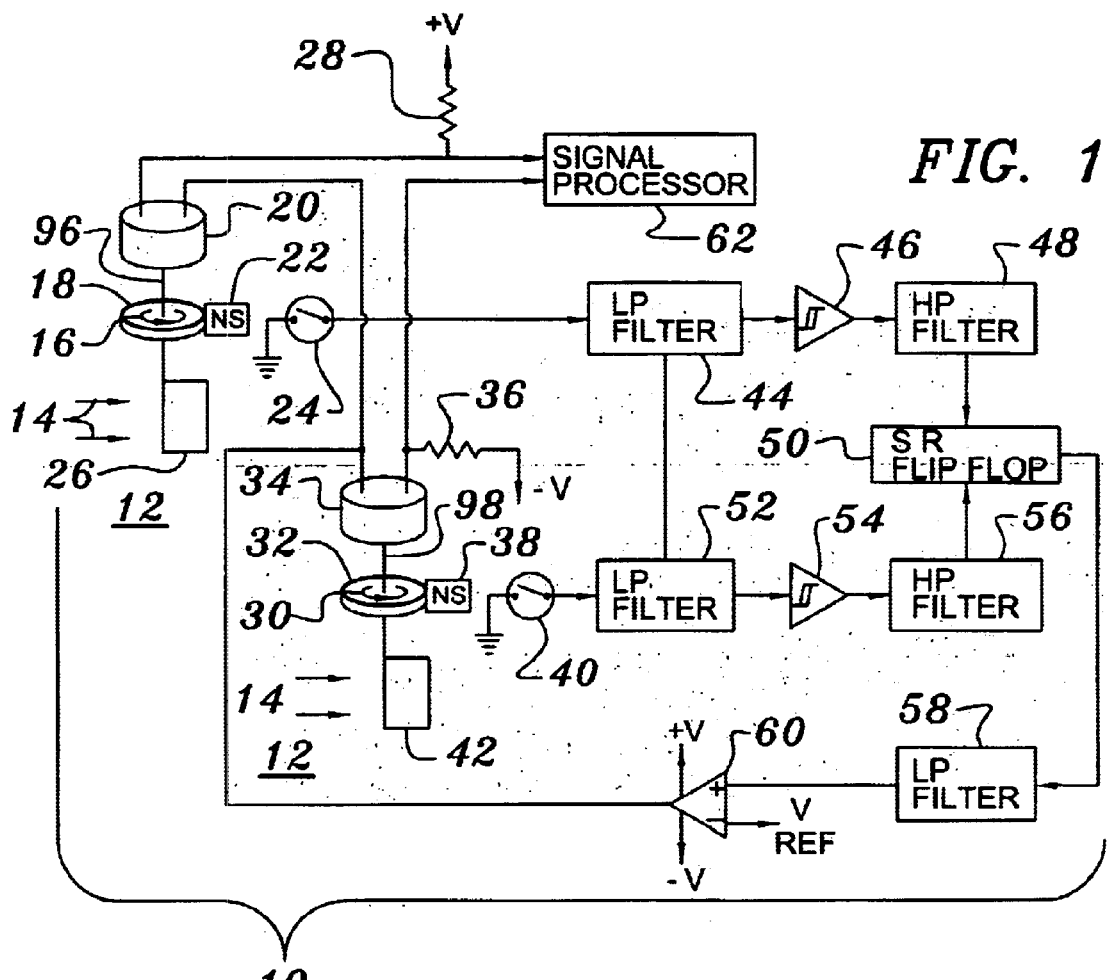
FIG. 1 is a largely schematic depiction of principle components of a flow sensor of the invention comprising two vanes directly coupled to respective drive transducers.

An embodiment of a flow sensor 10 of the invention in which an average rate of rotation of two vanes is controlled by a motor control circuit is schematically depicted in FIG. 1. This embodiment comprises two electromechanical drive transducers 20, 34 connected through respective shafts 96, 98 to respective vanes 26, 42 in this embodiment each of the shafts 96, 98 also comprises a respective disc 18, 32 having a respective magnet 22, 38 which can actuate a respective magnetic reed switch 24, 40. A fluid 12 wets both vanes and has a flow direction indicated by arrows 14. A resistor 28 connects the positive side of a power supply to one electromechanical drive transducer 20 and to a signal processor 62. Correspondingly, another resistor 36 is connected to the second electromechanical drive transducer 34 and to the signal processor 62. The signal produced by cycling a switch 24 passes through a low pass filter 44, a Schmitt trigger 46, and a high pass filter 48 to a SR-type flip-flop 50. Similarly, the signal produced from switch 40 passes through a second low pass filter 52, a second Schmitt trigger 54, a second high pass filter 56 and to the SR flip-flop 50. The output from the SR flip-flop 50 connects, through the low pass filter 58, to the positive input of a differential amplifier 60 while a refetence voltage connects to its negative input. The output from a differential amplifier 60 connects to the common connection between the series connected electromechanical drive transducers 20 and 34. A power supply (not shown) provides the operating power for the sensor.

One form that the drive transducers 20, 34 may take is that of a small DC electric motor in which the operating power requirements vary in response to load changes over a wide range. An example of such a motor is the type 1616E018ST manufactured by MicroMo Electronics, Inc. When used with a ten volt power supply, this motor requires only four milliamperes when unloaded but draws over forty milliamperes when fully loaded. The motor can be used to drive a reduction gear train which increases its output torque and reduces its output shaft speed. This causes parasitic motor generated signals, such as commutation ripple, to be much higher in frequency than the rotational speed of the vanes 26, 42 thus allowing the parasitic signals to be easily filtered out. A MicroMo gear train type 16AK with an 11.8:1 ratio is an example of such a gear train. Those skilled in the related arts will recognize that one could alternately select a motor operated from a constant current source that produced a large voltage variation responsive to load changes. Brush commutated motors are practical for moderately long life as the motor can generally be operated well below its maximum ratings. Electronically commutated motors can also be used.

Figure 1A:
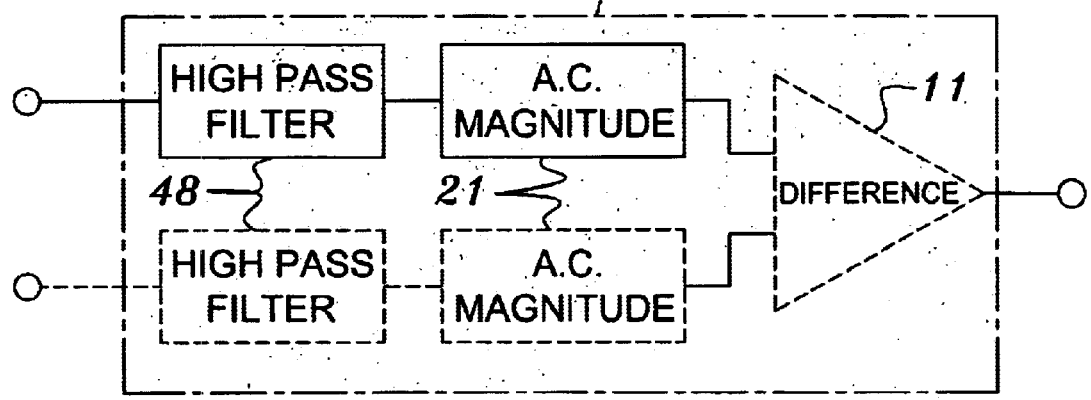
FIG. 1a is a schematic block diagram of a signal processor circuit of the invention.

In the various embodiments of the invention, drive transducers can be used to rotate or oscillate vanes in the fluid 12 at relatively low shaft speeds, which are typically in the range of a fraction of a rotation per second to several revolutions per second. In the embodiment depicted in FIG. 1 the vanes rotate at the same average angular speed and are oriented angularly with respect to each other and to the flow direction 14 so that when one of the vanes tends to rotate more slowly in response to flow induced drag, the other vane will correspondingly tend to rotate more quickly. These actions translate to transducer 20 requiring more current and transducer 34 less current at one location in the rotation cycle and the reverse current distribution occurring at another location in the cycle. These currents produce corresponding voltages across respective resistors 28, 36 that enter signal processor 62. A high pass filter 48 (e.g., a simple series combination of a capacitor and a resistor to ground) in the signal processor 62 is preferably used to remove from those signals the DC components corresponding to the steady state power requirements needed to rotate the vanes. The magnitudes of the remaining AC signals can be determined, as indicated by blocks 21 in FIG. 1a, and supplied to a differential amplifier 11 which extracts a difference voltage, representative of the fluid flow rate.

It is noteworthy that the use of only the alternating components of the transducer signals results in very low drift of the sensor's zero flow rate calibration point. As a result, the sensor 10 can be reliably used at relatively low flow rates when compared to other moving target sensors and can thereby enjoy advantages in being able to operate reliably over a wider range of flow rates with better long term stability of calibration. The advantages of and use of only the alternating signal components, which correspond to the drag variations experienced by the vanes, are also applicable to the sensor 10 configurations depicted in FIGS. 2–6.

In the sensor of FIG. 1, the vanes 26, 42 must be maintained, on the average, in a selected relative angular alignment with each other and with the fluid 12 flow direction 14. That is, at zero flow rate there is a selected angular difference between the spacing of the two vanes at all times. When the fluid flows so that the motion of one vane is aided while the that of the other is simultaneously inhibited, the instantaneous angular difference varies and only the average is maintained. Most of the components depicted in FIG. 1 are used in one arrangement for maintaining this average difference. Transducers 20, 34 rotate respective discs 18, 32, having respective associated magnets 22, 38, which activate corresponding magnetic reed switches 24, 40, for a portion of the rotation cycle so that the input signals to the low pass filters 44, 52 are rectangular waves having an average duty cycle of 50%. The outputs from the low pass filters are approximate rectangular waves, as the low pass filters serve only to remove the effects of contact bounce. The outputs are then squared up in the Schmitt triggers 46, 54 with the high frequency components corresponding to the sharp rise and fall time components of the waves passing through the high pass filters 48, 56, to enter the SR flip-flop 50. The SR flip-flop 50 selects only the positive going components from the high pass filter 48 to set its output high and correspondingly, only the positive components of the high pass filter 56 to set its output low. The mechanical locations of the magnets on the discs and their respective magnetic reed switches are such that the average duty cycle of the rectangular wave produced by the SR flip-flop is nominally 50%. This output is smoothed by a long time constant low pass filter 58 to produce a DC signal supplied to the positive input of a differential amplifier 60 that has its negative input connected to a DC reference voltage corresponding to 50% of the SR flip-flop output. The output from the differential amplifier 60 is connected to a common point between the transducers 20, 34 so as to effectively speed up one transducer while slowing the other to maintain the average 50% duty cycle output of the SR flip-flop. Other means known in the art for detecting the angular position (or speed) of the vanes 26, 42 may also be employed. These include, but are not limited to, photoelectric, magnetic hall effect, capacitive, and RF inductive approaches, all which are also applicable to various embodiments of the sensor of the invention.

Figure 5:
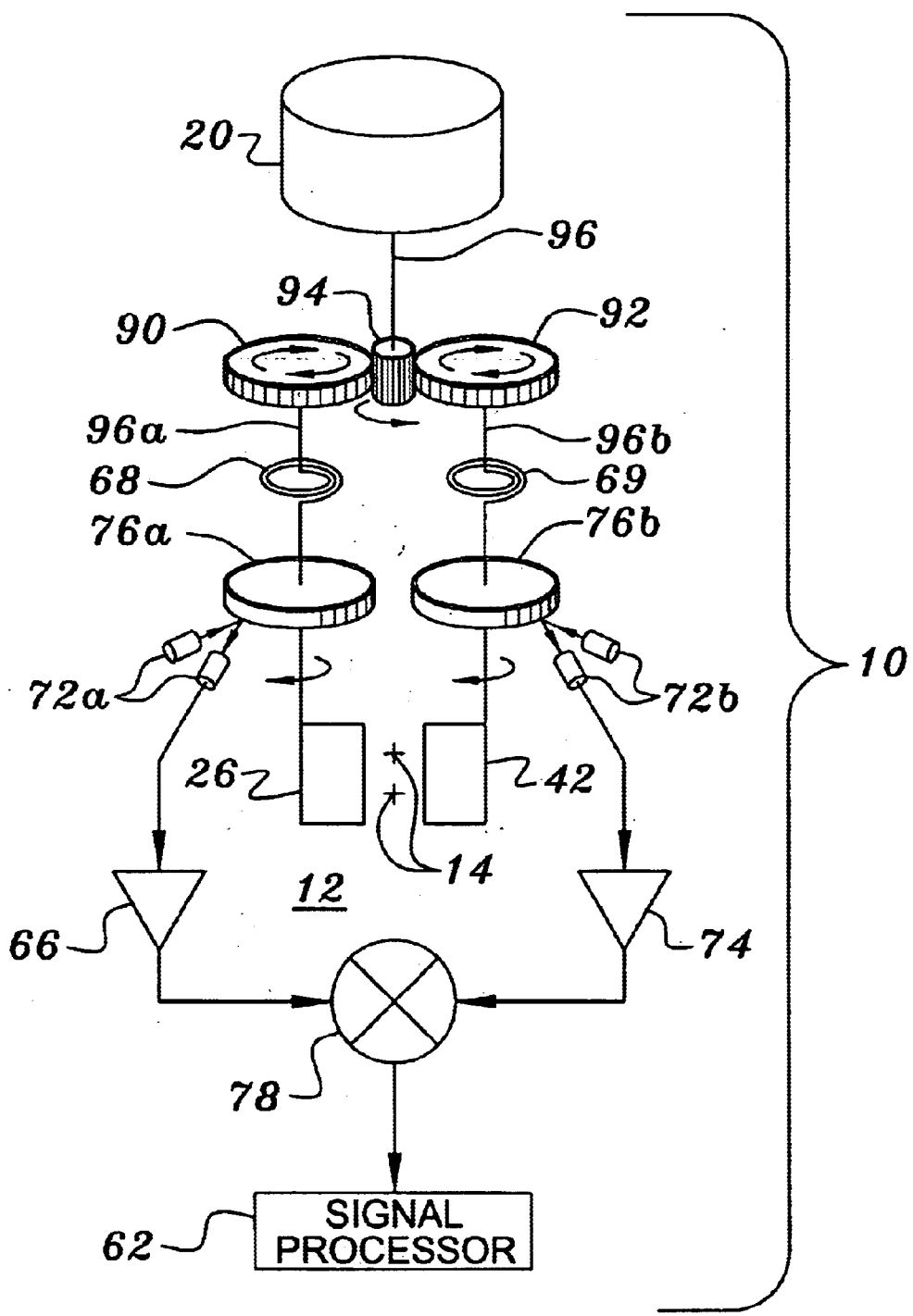
FIG. 5 is a schematic depiction of principle components of a flow sensor of the invention comprising two vanes coupled to a drive transducer by respective compliant couplings.
Figure 6:
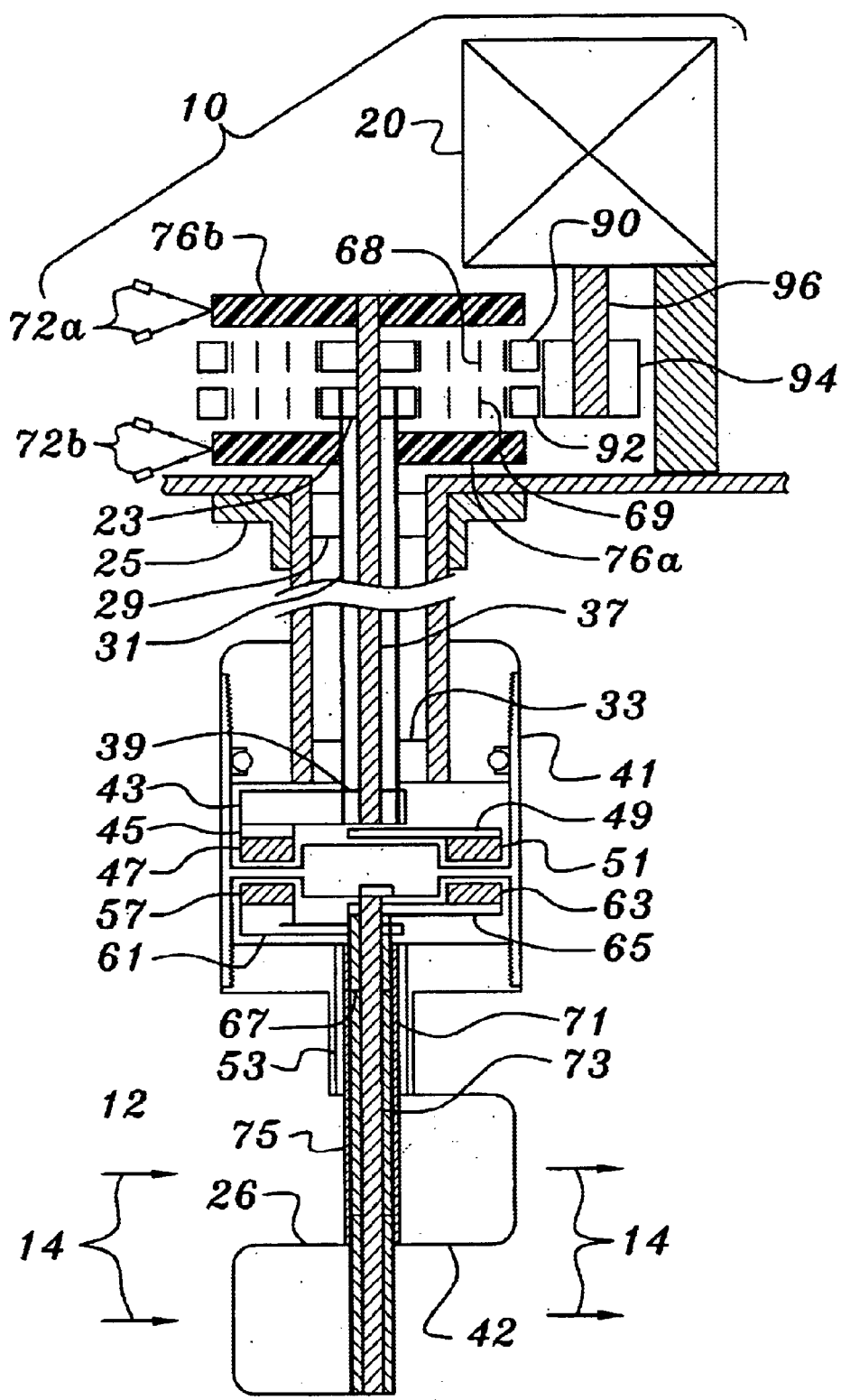
FIG. 6 is a cross sectional view of a flow sensor of the invention that is in general accordance with the embodiment schematically depicted in FIG. 5.

FIG. 1 provides an example of a flow sensor 10 using two vanes and two transducers in a balanced configuration. By exposing two vanes to a flow stream that affects them inversely and then detecting the difference in their response to the stream, the common mode flow sensing errors can be rejected so that a wider range of flow rates may be detected and a higher precision of measurement achieved. Error sources compensated by these difference measurements include vibration of a pipe to which a sensor is mounted and gravitational effects on the instantaneous speed of a vane rotating about a non-vertical shaft. This is dramatically illustrated in the sensor's response to an abrupt change in fluid flow rate which induces changes in the DC levels at the sensing resistors 28, 36 which cancel each other in this balanced configuration. When a single ended sensor is used, however, the abrupt change in the corresponding DC level shift would initially have been sensed as an overshoot or undershoot of the flow related signal. Balanced operation is also possible with the sensor arrangements of FIGS. 2, 3 and 4 if additional vanes and associated transducing and detection mechanisms are added to achieve a desired paired configuration. FIGS. 5 and 6 provide further variations of a balanced configuration which include a coaxial arrangement as well as isolation from the fluid 12 media.

Figure 2:
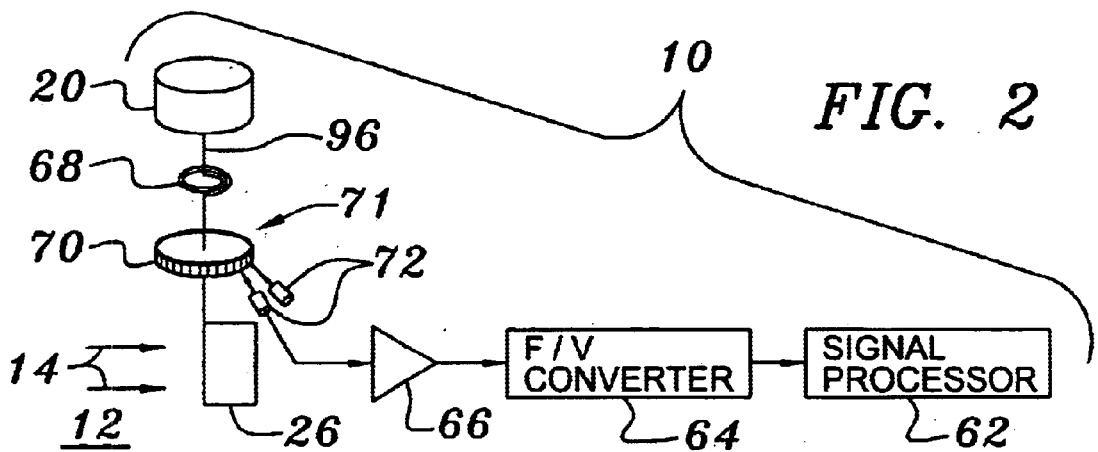
FIG. 2 is a largely schematic depiction of principle components of a flow sensor of the invention comprising a single vane connected to a drive transducer by means of a compliant coupling.

A single-vane embodiment of a sensor of the invention 10 is depicted in FIG. 2, in which a drive transducer 20 is connected to a shaft 96 having a compliant coupling 68, such as the depicted torsion spring, interposed between the a first shaft portion directly connected to the drive transducer 20 and a second shaft portion directly connected to the driven vane 26. A disc 70 portion of a shaft speed transducer 71 may be fixedly attached to the portion of the shaft 96 between the coupling 68 and the vane 26. As the shaft 96 rotates, the elastic property of the spring or other compliant coupling 68 enables the vane 26 to temporarily slow its rotational rate when the drag forces of the fluid 12 on the vane are in opposition to its rotation, and to then speed it up when the drag forces aid its rotation. The instantaneous angular motion of the vane can be determined by photoelectrically sensing the speed of the disc 70, which incorporates alternating reflective and non-reflective areas, by means of a known photo emitter/detector pair 72 that generate a series of pulses, the frequency of which is proportional to the shaft rotational rate. The output signal from photodetector 72 is amplified in a suitable amplifier 66, and then proceeds into a frequency-to-voltage converter 64 which provides the input signal to the signal processor 62. The signal processor 62 extracts the alternating component of the voltage, which corresponds to disc speed changes caused by the flowing fluid 12 acting on the vane 26 and is therefore representative of fluid flow rate. The signal processor 62 detects the magnitude of the alternating component and otherwise processes it as desired for a particular application.

The drive transducer 20 used in the configuration of FIG. 2 may be an electric motor and can be one of several types without being concerned about extracting from it a flow related signal as was required in the embodiment depicted in FIG. 1. Therefore, the motor types include stepper, DC, synchronous timing, ultrasonic, etc. It is also possible to use a drive transducer that provides less than 360 degrees of rotation and that oscillates a vane back and forth over an angular range selected so that flow aids the vane motion for substantially half of its range while inhibiting vane motion over the second half of the range. Similar transducers are also applicable to sensors 10 in FIGS. 3–6.

It may be noted that there are choices other than a torsion spring for the compliant coupling 68. For example, the function of this element could be satisfied with magnets attracting each other across a gap in which a barrier may be located to environmentally isolate sensor components other than the vane 26 from the fluid 12. Although the shaft speed version 71 of a shaft motion sensor is depicted in FIG. 2 with a photoemitter/detector pair 72 adjacent the rotating disc 70, it will be understood that in configurations combining a compliant coupling and environmental isolation, optical fibers (not shown) can be used to remotely locate the electrically powered portion of the shaft motion transducer. It will also be understood that similar arrangements can be employed with shaft position transducers 13, as depicted in FIGS. 3–6. Moreover, although photoelectric sensors are illustrated as a matter of convenience, it will be understood that other forms of shaft motion sensing through a barrier, such as magnetic, RF inductive and ultrasonic, approaches may be used in the various embodiments of the invention.

Figure 3:
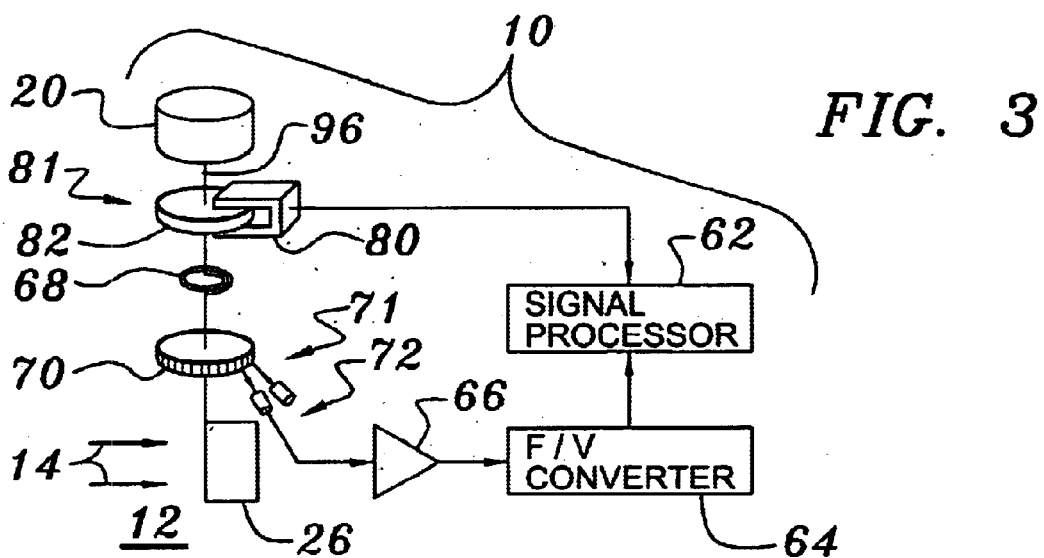
FIG. 3 is a schematic depiction of principle components of a flow sensor similar to that of FIG. 2 but further comprising an angular position transducer.

Turning now to FIG. 3, one finds an arrangement similar to that of FIG. 2, save for the addition of a shaft encoder 81, which may comprise the known combination of an encoded disc 82 and a photoelectric reader 80. The shaft encoder 81 can be used to determine the precise angular position of the shaft and provide a signal representative of that setting to the signal processor 62. As in the embodiment of FIG. 2, a shaft rotational speed sensor 71 provides an output to an amplifier 66 and a frequency/voltage converter 64. The output from frequency/voltage converter 64 is a second input to the signal processor. Thus, the embodiment of FIG. 3 generally operates like that of FIG. 2 with the exception that the precise angular location of the vane is known, so that the signal processor 62 can provide both flow direction and flow rate output signals. This type of sensor would find application in natural bodies of water, where it is desired to record flow speed and direction over a period of time.

Figure 4:
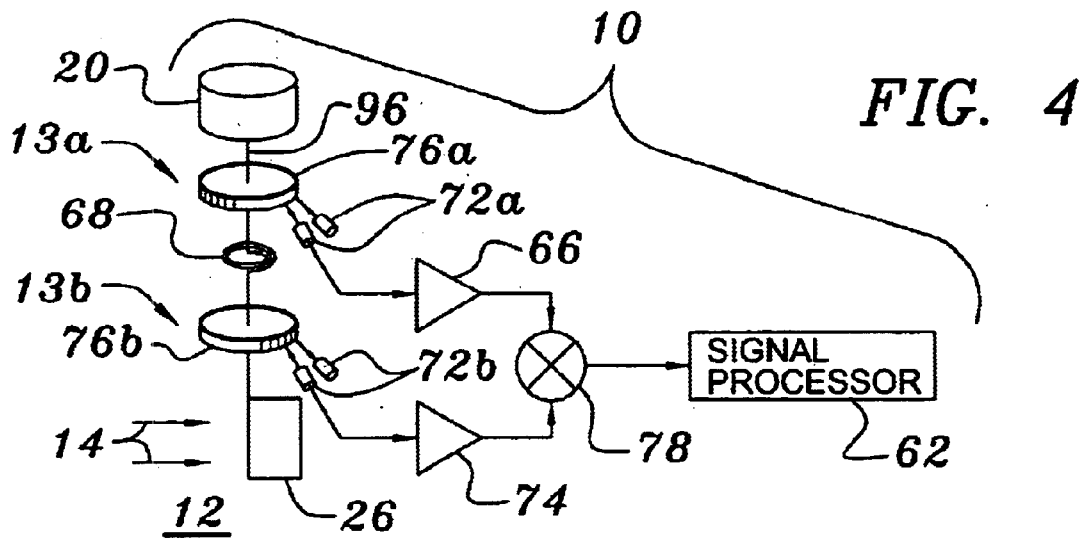
FIG. 4 is a schematic depiction of principle components of a flow sensor similar to that of FIG. 2, but comprising an additional shaft position transducer.

In yet another embodiment of the invention, as depicted in FIG. 4, two shaft angular position sensors 13*a*, 13*b*, each depicted as comprising a respective disk 76a, 76b and a respective photoemitter-photodetector pair 72a, 72b, are attached to respective portions of the shaft 96 on either side of the compliant coupling 68. In this embodiment the output signals from the two angular setting sensors 13a, 13b are amplified by respective amplifiers 66, 74 which supply respective outputs to a phase detector 78 having an output to the signal processor 62. The alternating component in the output signal from phase detector 78 is representative of the fluid 12 flow rate and is detected and otherwise processed in signal processor 62 as desired for a particular application. It will be noted that this configuration can be used for measurement of both flow rate and direction. Moreover, although the shaft position transducers depicted in FIG. 4 need only be precise enough for measuring phase differences, a more accurate shaft encoder, of the type depicted in FIG. 3, could also be used.

Turning now to FIG. 5, one finds still another embodiment of the flow sensor 10 of the invention. Here, the drive transducer 20 turns a gear 94 which is coupled to gears 90, 92 at the ends of separate shafts 96a, 96b, each of which is connected to a respective compliant coupling 68, 69. These compliant couplings 68, 69 connect to respective discs 76a, 76b which contain alternating reflective and non-reflective areas that are preferably photoelectrically sensed by associated photoemitter/detector pairs 72a, 72b. The vanes 26, 42 at the ends of the shafts 96a, 96b are in contact with a fluid 12 flowing in a direction indicated by the back of arrows 14—i.e., being into the paper. In this embodiment the output signals from the photoemitter/detector pairs 72a, 72b are amplified by respective amplifiers 66, 74 before being input into the phase detector 78, which has an output to the signal processor 62.

In the embodiment depicted in FIG. 5, the vanes 26, 42 are oriented with respect to each other and with respect to the direction of the fluid flow 12 so that when the flow related drag forces on one vane oppose its rotation, the corresponding drag forces on the other vane aid its rotation. The forces are equal in magnitude so that the transducer provides only the energy needed to overcome frictional losses. During a rotational cycle the elastic property of the springs 68, 69 enable the vanes 26, 14 to alternately angularly lag or lead each other according to the drag forces of the fluid 12 on the vanes. The change in angular orientation between the discs is electronically detected by the photoelectric photoemitter/detector pairs to provide output signals which are detected by the phase detector 78. The alternating component of the phase detector 78 output signal is representative of fluid 12 flow rate and is used and otherwise processed by the signal processor 62 as desired for a particular application.

The use of a common transducer 20 for rotating a pair of vanes 26, 42 has, in addition to the advantages of the sensor configuration depicted in FIG. 1, an advantage of reducing sensing errors due to rotation imperfections in the transducer. Such imperfections would otherwise produce signals which would increase flow sensing errors. A further advantage is the relatively low power consumption as the drive transducer 20 in the embodiment of FIGS. 5 and 6 need only supply frictional losses.

The principle mechanical components of the embodiment depicted schematically in FIG. 5 are further detailed in a sectional view of FIG. 6. In this depiction, a sensor 10 is configured as an insertion probe which can enter a fluid-carrying pipe through a fitting mounted on the pipe. Preferably, the mechanical components of the probe are rearranged about coaxial shafts rather than using the two parallel shafts depicted in FIG. 5. The output shaft 96 from the drive transducer 20 turns a drive gear 94 which turns gears 90 and 92. The central areas of the driven gears 90, 92 are cut out to provide room for torsion springs 68, 69, which are configured as spiral coils made from flat stock. The hub of one of the springs 68 attaches to a central shaft 37 which is preferably suspended by ball bearings 23, 39 and which has a radial arm 49 mounted at its bottom and a shaft angular setting sensing disc 76b at its top. Correspondingly, the hub of the second spring 69 is connected toga tube 31 which is coaxial with the central shaft 37 and which is suspended by ball bearings 29 and 33. The tube 31 mounts radial arm 43 at the bottom and disc 76a at the top. As in earlier described embodiments, the discs 76a, 76b contain alternating reflective and non-reflective areas that can be photoelectrically sensed by photoemitter/detector pairs 72a, 72b respectively. The radial arm 49 attached to the central shaft 37 has a permanent magnet 51 attached to it, and the radial arm 43 attached to the coaxial tube 31 has a spacer 45 and a second permanent magnet 47 attached to it. Each of these magnets 47, 51 is attracted to a corresponding permanent magnet 57, 63 attached to a respective radial arm 61, 65 on the opposite side of an environmental wall 59 separating the wetted and non-wetted portions of the sensor 10. In a similar fashion to the arrangement of the non-wetted parts, one of the lower radial arms 65 is attached to a lower central shaft 73 supported by sleeve bearings 67 and 75 and thrust bearing 55, and connected to one of the vanes 26. Correspondingly, the other radial arm 61 is attached to a lower coaxial tube 71 supported by a bearing 53 and carrying the second vane 42.

Although the present invention has been with described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A method of measuring a rate of flow of a fluid, the method comprising the steps of:

providing at least one vane extending radially outward form a respective shaft disposed perpendicular to a direction in which the fluid flows, the at least one vane wetted by the flowing fluid;

operating at least one electromechanical dive transducer to repetitively turn, at an average rate, the at least one vane about the respective shaft through an angular range selected so that the flowing fluid aids the turning operation within substantially a first half of the range; the range further selected so that the flowing fluid inhibits the turning motion within substantially the second half of the range;

acquiring an electrical signal representative of an alternating component of the turning motion and generating therefrom an output representative of the rate of fluid flow.

2. The method of claim 1 wherein the turning motion comprises continuous rotation.

3. The method of claim 1 wherein the at least one vane comprises two vanes aligned so that one of the vanes is within the first half of its respective turning range when the second vane is within the second half of its respective turning range; wherein each of the two vanes is turned by a respective electromechanical drive transducer and wherein the step of acquiring an electrical signal representative of an alternating component of the turning motion comprises determining a difference between signals supplied by the two electromechanical drive transducers.

4. The method of claim 1 wherein one electromechanical drive transducer turns one vane by means of a shaft having a compliant coupling interposed between the vane and the electromechanical drive transducer, and wherein the electrical signal representative of an alternating component of the turning motion is measured by means of an angular rate sensor disposed between the vane and the compliant coupling.

5. The method of claim 1 wherein one electromechanical drive transducer turns one vane by means of a shaft having a compliant coupling interposed between the vane and the one electromechanical drive transducer; and wherein the electrical signal representative of an alternating component of the turning motion is acquired by steps comprising:

measuring a first angular position of a portion of the shaft disposed between the vane and the compliant coupling;

measuring a second angular position of a portion of the shaft disposed between the compliant coupling and the electromechanical drive transducer; and determining a difference between the two angular position measurements.

6. The method of claim 1 wherein the at least one vane comprises two vanes extending from respective shafts, each vane aligned so that when no fluid is flowing one of the vanes is within the first half of its respective turning range and the second vane is within the second half of its respective turning range; wherein each of the shafts comprises a compliant coupling interposed between the at least one electromechanical drive transducer and the respective vane, and wherein the step of acquiring the electrical signal representative of an alternating component of the turning motion comprises determining a difference between a first output signal from a first angular position sensor operatively associated with the first shaft and a second output signal from a second angular position sensor operatively associated with the second shaft.

7. An apparatus for measuring the rate of flow of a fluid along a flow direction, the apparatus comprising:

two vanes, each of the vanes extending outward along a respective radius of a respective one of two parallel shafts, each of the shafts perpendicular to the flow direction, the two vanes arranged to have a selected angular difference between their respective radii when the rate of flow is zero;

at least one electromechanical drive transducer drivingly coupled to each of the shafts by means for maintaining, over a cycle of a repetitive turning motion, an average angular difference equal to the selected angular difference; and a signal processor for deriving a flow rate output from a difference between two inputs, each of the inputs representative of one of an instantaneous angular position of a respective one of the shafts and an instantaneous angular speed of the respective one of the shafts.

8. The apparatus of claim 7 wherein the selected angular difference is one hundred eighty degrees of arc.

9. The apparatus of claim 7 wherein the at least one electromechanical drive transducer comprises two electric motors; wherein the means for maintaining the selected angular difference comprises a motor control circuit for measuring a phase difference between the two shafts and for controlling the relative speed of the two motors so that the respective times required for each of the two shafts to experience a respective single rotation are equal; and wherein each of the signal processor inputs comprises the respective drive current supplied to the respective motor.

10. The apparatus of claim 7 wherein the at least one electromechanical drive transducer comprises a single electric motor coupled to both of the shafts by means of respective driven gears; wherein each of the shafts comprises a respective compliant coupling interposed between the respective driven gear and the respective vane; and wherein each of the inputs to the signal processor comprises a respective output from a respective angular position transducer arranged to measure an angular setting of that portion of the respective shaft extending between the respective compliant coupling and the respective vane.

11. An apparatus for measuring the rate of flow of a fluid along a flow direction, the apparatus comprising:

a vane extending outward along a radius of a first portion of a shaft disposed perpendicular to the flow direction;

an electromechanical drive transducer drivingly coupled to a second portion of the shaft to supply thereto a repetitive turning motion at an average angular shaft speed;

a compliant coupling connecting the first and second portion of the shaft;

a shaft motion sensing transducer for producing a first time-varying output signal representative of one of an instantaneous angular setting of the first portion of the shaft and an instantaneous angular speed of the first portion of the shaft; and a signal processor connected to the shaft motion sensing transducer, the signal processor comprising a respective high pass filter for removing a DC component from the signal representative of one of an instantaneous angular setting of the first portion of the shaft and an instantaneous angular speed of the first portion of the shaft and for deriving a flow rate from an output of the high pass filter.

12. The apparatus of claim 11 wherein the shaft motion sensing transducer is operable to produce the first time varying output responsive to the instantaneous angular setting of the first portion of the shaft, the apparatus further comprising;

a second shaft motion sensing transducer for producing a second time varying output signal from the instantaneous angular setting of the second portion of the shaft; and a phase detector electrically connected to the first and second shaft motion sensing transducers, the phase detector operable to detect a difference signal between the first and the second time varying outputs and to supply the difference signal to the signal processor.

13. The apparatus of claim 11 further comprising an angular position transducer operable to measure the angular position of the portion of the shaft directly connected to the motor and to supply an angular position signal as an input to the signal processor, and wherein the signal processor is thereby enabled to derive both a flow rate output and flow direction output from the two inputs.

14. The apparatus of claim 11 wherein the shaft motion sensing transducer is operable to produce the first time varying output responsive to the instantaneous angular setting of the first portion of the shaft, the apparatus further comprising:
- a second vane extending outward along a respective radius of a first portion of a second shaft that is also disposed perpendicular to the flow direction;
- a second compliant coupling connecting the first portion of the second shaft to a second portion of the second shaft drivingly connected to the electromechanical drive transducer;
- a second shaft motion sensing transducer operable to produce a second time-varying output responsive to an instantaneous angular setting of the first portion of the second shaft; and
- a phase detector electrically connected to the first and second shaft motion sensing transducers, the phase director operable to detect a difference signal between the first and the second time varying outputs and to supply the difference signal to the signal processor.

15. The apparatus of claim 11 wherein the shaft motion transducer is operable to produce a frequency signal responsive to the instantaneous angular speed of the first portion of the shaft, the apparatus further comprising a frequency-to-voltage converter for producing the time-varying signal supplied to the signal processor.

* * * * *